United States Patent
Kozyuk et al.

(10) Patent No.: US 7,935,157 B2
(45) Date of Patent: May 3, 2011

(54) METHOD FOR REDUCING FREE FATTY ACID CONTENT OF BIODIESEL FEEDSTOCK

(75) Inventors: Oleg V. Kozyuk, North Ridgeville, OH (US); Martin Brett, Lakewood, OH (US)

(73) Assignee: Arisdyne Systems, Inc., Cleveland, OH (US)

( * ) Notice: Subject to any disclaimer, the term of this patent is extended or adjusted under 35 U.S.C. 154(b) by 470 days.

(21) Appl. No.: 12/245,057

(22) Filed: Oct. 3, 2008

(65) Prior Publication Data

US 2009/0038210 A1    Feb. 12, 2009

Related U.S. Application Data

(63) Continuation-in-part of application No. 12/167,516, filed on Jul. 3, 2008, now Pat. No. 7,754,905.

(60) Provisional application No. 60/973,332, filed on Sep. 18, 2007, provisional application No. 60/954,659, filed on Aug. 8, 2007.

(51) Int. Cl.
*C10L 1/18* (2006.01)
(52) U.S. Cl. .......................................... 44/308; 554/174
(58) Field of Classification Search ................ 44/308; 554/174
See application file for complete search history.

(56) References Cited

U.S. PATENT DOCUMENTS

| | | |
|---|---|---|
| 3,551,073 A | 12/1970 | Petrovits |
| 3,852,191 A | 12/1974 | Zucker et al. |
| 3,937,445 A | 2/1976 | Agosta |
| 4,127,332 A | 11/1978 | Thiruvengadam et al. |
| 4,695,411 A | 9/1987 | Stern et al. |
| 4,698,186 A | 10/1987 | Jeromin et al. |
| 4,944,163 A | 7/1990 | Niggemann |
| 5,180,052 A | 1/1993 | Smith et al. |
| 5,492,654 A | 2/1996 | Kozyuk et al. |
| 5,628,623 A | 5/1997 | Skaggs |
| 5,810,052 A | 9/1998 | Kozyuk |
| 5,810,474 A | 9/1998 | Hidalgo |
| 5,868,495 A | 2/1999 | Hidalgo |
| 5,931,771 A | 8/1999 | Kozyuk |
| 5,937,906 A | 8/1999 | Kozyuk |
| 5,969,207 A | 10/1999 | Kozyuk |

(Continued)

FOREIGN PATENT DOCUMENTS

EP    0948400    7/2003

(Continued)

OTHER PUBLICATIONS

Mandar A. Kelkar et al., "Cavitation as a novel tool for process intensification of biodiesel synthesis," Chemical Engineering Department, Institute of Chemical Technology, University of Mumbai, Matunga, Mumbai, 2 pages dated unknown.

(Continued)

*Primary Examiner* — Cephia D Toomer
(74) *Attorney, Agent, or Firm* — Pearne & Gordon LLP (57) ABSTRACT

A method comprising applying controlled flow cavitation apparatuses and holding tanks to a pretreatment process in order to reduce the free fatty acid content of a biodiesel feedstock. A feedstock comprising a high content of free fatty acids can be passed through controlled flow cavitation apparatuses and holding tanks at a velocity capable of generating hydrodynamic cavitation zones and subsequent dwell times where the free fatty acid content can be reduced to below 2%.

18 Claims, 6 Drawing Sheets

U.S. PATENT DOCUMENTS

| | | | |
|---|---|---|---|
| 5,971,601 | A | 10/1999 | Kozyuk |
| 6,012,492 | A | 1/2000 | Kozyuk |
| 6,035,897 | A | 3/2000 | Kozyuk |
| 6,386,751 | B1 | 5/2002 | Wootan et al. |
| 6,440,057 | B1 | 8/2002 | Ergun et al. |
| 6,502,979 | B1 | 1/2003 | Kozyuk |
| 6,538,041 | B1 | 3/2003 | Marelli |
| 6,802,639 | B2 | 10/2004 | Kozyuk |
| 6,857,774 | B2 | 2/2005 | Kozyuk |
| 6,878,837 | B2 | 4/2005 | Bournay et al. |
| 6,887,859 | B2 | 5/2005 | Clapp et al. |
| 6,965,044 | B1 | 11/2005 | Hammond et al. |
| 6,982,155 | B1 | 1/2006 | Fukuda et al. |
| 7,086,777 | B2 | 8/2006 | Kozyuk |
| 7,087,178 | B2 | 8/2006 | Romanyszyn et al. |
| 7,122,688 | B2 | 10/2006 | Lin et al. |
| 7,135,155 | B1 | 11/2006 | Long et al. |
| 7,178,975 | B2 | 2/2007 | Kozyuk |
| 7,207,712 | B2 | 4/2007 | Kozyuk |
| 7,247,244 | B2 | 7/2007 | Kozyuk |
| 7,314,306 | B2 | 1/2008 | Kozyuk |
| 7,452,425 | B1 | 11/2008 | Langhauser |
| 7,507,846 | B2 * | 3/2009 | Pelly .............................. 554/170 |
| 2002/0009414 | A1 | 1/2002 | Moser et al. |
| 2002/0054995 | A1 | 5/2002 | Mazurkiewicz |
| 2004/0028622 | A1 | 2/2004 | Gurin |
| 2004/0254387 | A1 | 12/2004 | Luxem et al. |
| 2005/0027137 | A1 | 2/2005 | Hooker |
| 2005/0107624 | A1 | 5/2005 | Lin et al. |
| 2005/0136520 | A1 | 6/2005 | Kinley et al. |
| 2005/0274065 | A1 | 12/2005 | Portnoff et al. |
| 2006/0094890 | A1 | 5/2006 | Sharma et al. |
| 2007/0066480 | A1 | 3/2007 | Moser et al. |
| 2007/0152355 | A1 | 7/2007 | Hartley |
| 2007/0161095 | A1 | 7/2007 | Gurin |
| 2008/0044891 | A1 | 2/2008 | Kinley et al. |
| 2008/0099410 | A1 | 5/2008 | Sprague |
| 2008/0277264 | A1 | 11/2008 | Sprague |

FOREIGN PATENT DOCUMENTS

| | | |
|---|---|---|
| GB | 2016940 | 9/1979 |
| JP | 2004-250436 | 9/2004 |
| KR | 10-2003-0066246 A | 8/2003 |

OTHER PUBLICATIONS

International Search Report (PCT/US2008/069170) dated Sep. 25, 2008.

Notification Of Transmittal Of The International Search Report And The Written Opinion Of the International Searching Authority, Or The Declaration; Written Opinion Of The International Searching Authority; International Search Report; PCT/US2008/078923, Arisdyne Systems, Inc. et al; Filed Oct. 6, 2008.

* cited by examiner

METHOD FOR REDUCING FREE FATTY ACID CONTENT OF BIODIESEL FEEDSTOCK

This application is a continuation-in-part of U.S. patent application Ser. No. 12/167,516 filed Jul. 3, 2008, now U.S. Pat. No. 7,754,905, which claims the benefit of U.S. Provisional Patent Application Ser. Nos. 60/954,659 filed Aug. 8, 2007 and 60/973,332 filed Sep. 18, 2007, the contents of which are incorporated herein by reference in their entirety.

FIELD OF THE INVENTION

The present invention relates generally to esterification of free fatty acids and more particularly to esterification of free fatty acids in controlled cavitation zones.

BACKGROUND OF THE INVENTION

Biodiesel fuel is produced by the transesterification of triglycerides, a source of non-free fatty acids, found in a feedstock base. A feedstock base will comprise triglycerides and "free" fatty acids, the latter of which will impede the production of biodiesel fuel. Feedstock sources containing a free fatty acid content higher than 3% are often unsuitable for production of biodiesel fuel due to reaction complications and low biodiesel conversion rates. Waste oils and other oil by-products often have a high free fatty acid content but are lower in cost when compared to refined and natural oils with a lower free fatty acid content. One of the complications of using a feedstock source with a high free fatty acid content is the tendency of the free fatty acids to neutralize the basic catalyst in the transesterification reaction. Free fatty acids can consume catalyst and forms soap by-products. Soaps act to inhibit the separation of biodiesel product from glycerin which causes a low yield of biodiesel. Free fatty acids can also act to contaminate the biodiesel product which prompts a necessary purification step. This purification step then causes a lengthier production process which subsequently increases production costs.

Conventional methods for reducing the free fatty acid content are done in conjunction with the transesterification reactions that produce biodiesel fuel. These methods generally require a long processing time, often hours to even days, and may not provide a suitable reduction in the free fatty acid content. The long processing times are also cost ineffective.

Accordingly, there is a need in the art for an apparatus and method of reducing the free fatty acid content of a feedstock source prior to introduction to the production of biodiesel fuel and the associated transesterification reactions that is cost effective, reduces processing times, and provides suitable free fatty acid levels. The apparatus and method can provide an esterification reaction environment such that the level of free fatty acids in the feedstock source is reduced to less than 2% in a matter of minutes. By providing a method for lowering the free fatty acid content prior to the base-catalyzed transesterification reaction, the soap produced in the subsequent transesterification reaction is reduced.

SUMMARY OF THE INVENTION

An esterification pretreatment method for reducing a high free fatty acid feedstock comprising providing a feedstock comprising a free fatty acid content in the range of 3 to 30% by weight, an alcohol and an acid catalyst. Combining the feedstock, alcohol and acid catalyst to form a reaction mixture and forcing the reaction mixture through at least two controlled flow cavitation apparatuses at a processing pressure capable of generating a hydrodynamic cavitation zone in each controlled flow cavitation apparatus, wherein a pressure differential of 50 to 250 psi across each of the controlled flow cavitation apparatuses is maintained. Holding the reaction mixture exiting the at least two controlled flow cavitation apparatuses in a holding tank for at least 10 minutes at a temperature of at least 100° C., wherein the free fatty acid content of the feedstock is reduced to less than 2% by weight by way of esterification reactions.

A method of reducing the free fatty acid content of a feedstock comprising mixing a feedstock comprising a free fatty acid content in the range of 3 to 30% by weight with an alcohol and acid catalyst to form a reaction mixture, wherein said alcohol to free fatty acid content of said feedstock is present in a ratio of at least 200:1. Passing the reaction mixture through at least two controlled flow cavitation apparatuses in series, wherein a pressure differential of 50 to 400 psi across each of the controlled flow cavitation apparatuses is maintained. Holding the reaction mixture exiting the at least two controlled flow cavitation apparatuses in a holding tank at a temperature of at least 100° C., wherein the free fatty acid content is reduced to lower than 2% through esterification reactions. The method of reducing the free fatty acid content in the feedstock to lower than 2% by weight of the feedstock is completed within 20 minutes.

BRIEF DESCRIPTION OF THE DRAWINGS

Aspects of the invention will be appreciated by a person having ordinary skill in the art based on the following description with reference to the following drawings, which are provided by way of illustration and not limitation.

DETAILED DESCRIPTION OF PREFERRED EMBODIMENTS

As used herein, the term "free" fatty acid is defined as a fatty acid that is not attached or otherwise bound to another molecule, such as a triglyceride or phospholipid. Sources of non-free fatty acids, such as triglycerides, are commonly used in transesterification reactions to produce biodiesel. Free fatty acids impede transesterification reactions used to produce biodiesel and thus it is beneficial to reduce the free fatty acid content of biodiesel feedstock, and in particular is the free fatty acid content is above 3 percent by weight of the feedstock. In other words, the free fatty acid content of a biodiesel feedstock is preferably reduced prior to processing the feedstock stream and performing transesterification reactions. As will be seen below, reduction of free fatty acid content of a feedstock prior to transesterification reactions to product biodiesel can improve biodiesel production efficiency and eliminate purification and/or separation steps necessitated by high free fatty acid content in the feedstock.

The use of controlled cavitation apparatuses and holding tanks in the pretreatment of a biodiesel feedstock source can reduce the level of free fatty acid which acts as an impurity in the process of biodiesel production. The controlled flow cavitation apparatus 12 generates a controlled flow cavitation zone which is applied during the esterification reaction of free fatty acids to triglycerides. The controlled flow cavitation zone acts to provide a high level of energy to the reaction, which in turn increases the rate of the esterification reaction. This high level of energy is used to introduce alcohol to the reaction sites of the free fatty acids at a faster rate than conventional methods. The holding tanks provide dwell times for further introduction of alcohol to the reaction sites and for further completion of esterification reactions. By using controlled cavitation in combination holding tanks to pretreat high free fatty acid feedstock sources, reaction times, production costs, and soap by-products are reduced in downstream biodiesel production involving transesterification reactions to product fatty acid alkyl esters.

The free fatty acids being pretreated in the present invention are supplied from feedstocks containing a source of free fatty acids, such as natural fats and oils. The source can be, but is not limited to, soybean oil, corn oil, cottonseed oil, olive oil, palm oil, palm kernel oil, peanut oil, linseed oil, safflower oil, canola oil, rapeseed oil, sesame oil, coconut oil, jatrohpa oil, mustard seed oil, castor oil, tall oil, algae oil, soap stock, beef tallow, lard, brown grease, white grease, yellow grease, fish oils, bacterial oils or fungal oils. This list includes any feedstock source of lipid, soap or phospholipid previously considered unsuitable for producing biodiesel. The feedstock source can also be comprised of multiple free fatty acid sources, such as blends of oils and/or animal fats.

Figure 1:
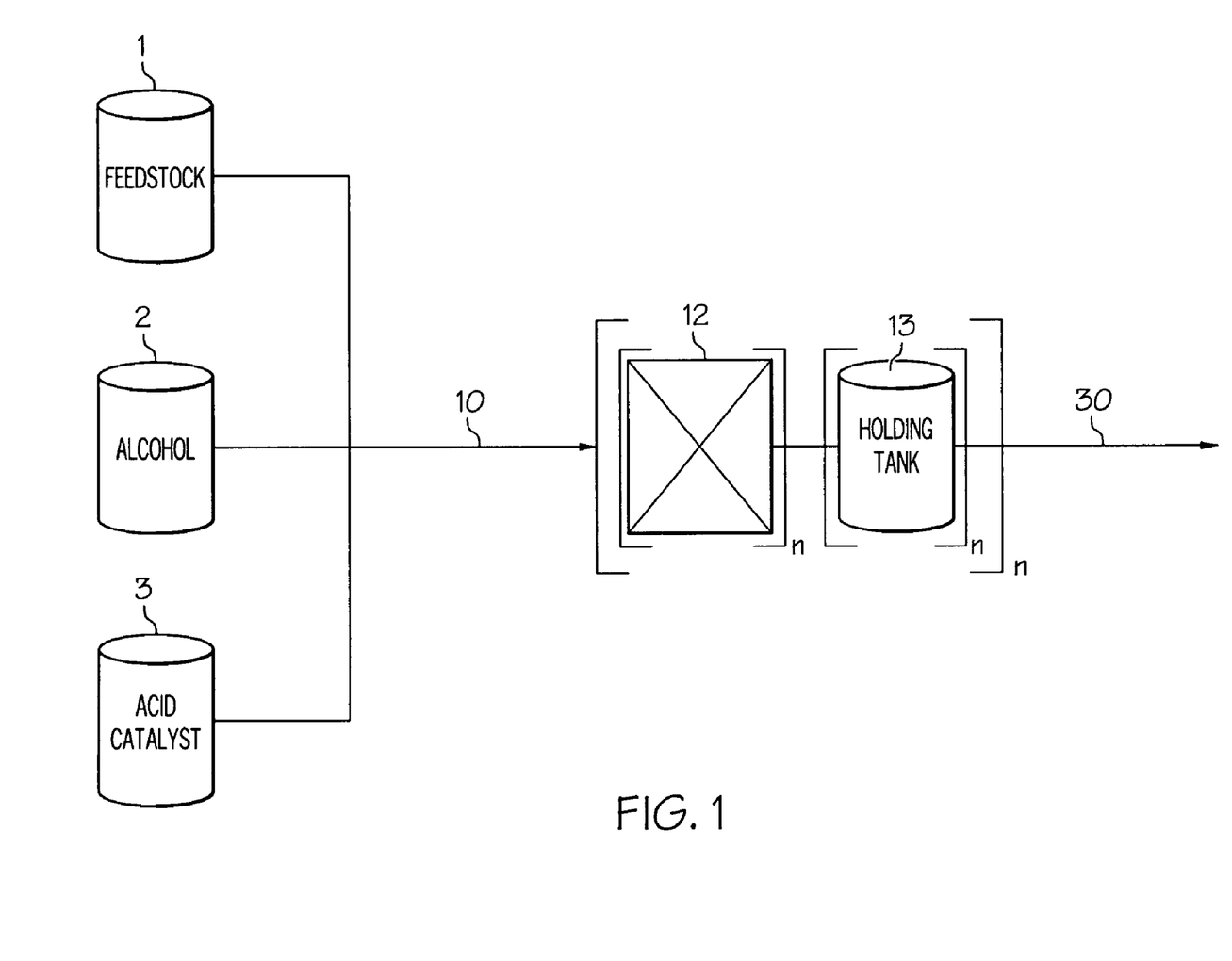
FIG. 1 is a schematic of a process for reducing free fatty acid content of a feedstock stream using at least one controlled flow cavitation apparatus in combination with at least one holding tank.

A process for the pretreatment of free fatty acids in a feedstock using a controlled flow cavitation apparatus and a holding tank is shown in FIG. 1. As shown, the feedstock 1, alcohol 2, and acid catalyst 3 are combined to form a reaction mixture 10 which can then be forced through a controlled flow cavitation apparatus 12 and then into a holding tank 13. The feedstock source 1 will be comprised of free fatty acids, wherein their content is higher than two percent. The feedstock source preferably contains a content of free fatty acid in the range of 30 to 3%, 20 to 3%, 15 to 3% or 10 to 3% by weight of the feedstock. The alcohol 2 can be a lower alcohol having one to five carbon atoms, wherein the alcohol can also be branched or unbranched. For example, the lower alcohol can be selected from the group consisting of methanol, ethanol, and mixtures thereof. The catalyst 3 can be acidic. Suitable acid catalysts are sulfuric acid, hydrochloric acid, phosphoric acid, an acidic metal halide or another strong Lewis or strong Bronsted acid or combinations thereof.

The starting feedstock 1 can have varying weight percentages of free fatty acid, for example, 30, 25, 20, 18, 15, 12, 10, 8, 6, 4, 3, and 2% by weight of the feedstock. As shown in the examples below, the weight percentages of free fatty acid were 12%, 3.8%, and 4.01%. The acid catalyst 3 can be employed in varying amounts, for example, from 0.1, 0.2, 0.5, 1.0, 1.5, and up to 2.0% by weight of the feedstock. The amounts of acid catalyst in the examples below were 1.0%, 0.5%, and 1.0% by weight of the feedstock. The ratio of acid catalyst 3 to free fatty acid content of the feedstock 1 can be 0.01:1 to 0.5:1, 0.1:1 to 0.5:1, or about 0.08:1 or 0.25:1. The amount of alcohol 2 can be in the range of 1% to 99%, for example, 1, 2, 5, 10, 20, 30, 40, 50, 60, 70, 80, 90, and 99% by weight, based on the weight of the reaction mixture comprising feedstock, acid catalyst and alcohol. The alcohol levels as shown in the examples below were 96%, 97%, and 91.5% by weight of the reaction mixture of feedstock 1 and acid catalyst 3. The ratio of alcohol 2 to free fatty acid content of the feedstock 1 can be 100:1 to 1000:1, 200:1 to 900:1, 200:1 to 400:1 or about 210:1, 295:1 or 882:1.

The reaction mixture 10 of FIG. 1 is pushed through a controlled flow cavitation apparatus 12 and a subsequent holding tank 13 by means of conventional processing equipment, for instance a pump (not shown in FIG. 1). The reaction mixture 10 can pass through multiple controlled cavitation apparatuses 12. FIG. 1 illustrates that multiple controlled flow cavitation apparatuses and holding tanks can be used, wherein the number of units is represented by the integer "n." The integer "n" can indicate any number of apparatuses and tanks. For example, the integer "n" can be in the range of 1 to 100, preferably 1 to 50, more preferably 1 to 25, more preferably 1 to 10, or about 2, 3, 4, 5, 6, 7, 8 or 9. The possible number of apparatuses and tanks in series is unlimited. Preferably, in an arrangement containing multiple controlled cavitation apparatuses 12, the apparatuses are aligned in a series where the reaction mixture 10 can pass through the first cavitation apparatus and directly into the next cavitation apparatus without splitting the flow of the reaction mixture. One or multiple holding tanks 13 can also be placed in between or after single cavitation apparatuses aligned after one another in series. In addition, one or multiple holding tanks can also be placed in between or after multiple cavitation apparatuses aligned after one another in series. Preferred placement of the holding tanks 13 will not separate the flow of the reaction mixture into more than one stream. In one embodiment, the reaction mixture 10 can be pushed through two controlled flow cavitation apparatuses 12 and then to a holding tank 13.

The process of FIG. 1 reduces the free fatty acid content through esterification reactions that convert the free fatty acids to esters. The esterification reaction is carried out by reacting the free fatty acid with an alcohol 2 in the presence of an acidic catalyst 3. The esterification of the free fatty acids takes place in the controlled flow cavitation apparatuses 12 and holding tanks 13 as described below. The processing stream 30, or reaction product, exiting the controlled flow cavitation apparatus can comprise fatty acid esters or triglycerides formed from the esterification reactions. The reaction product 30 can also comprises water, unreacted alcohol, unreacted free fatty acid, unreacted feedstock, catalyst and transient intermediates. The remaining free fatty acid content can be less than 2%, preferably less than 1.5%, preferably less than 1%, and more preferably less than 0.5%. The reaction product 30 containing the free fatty acid esters and/or triglycerides and low free fatty acid contents can be introduced as the starting reaction stream in a transesterification biodiesel process. Preferably, the pretreatment method of reducing the content of free fatty acids described herein is separately carried out prior to using the esterification reaction product in a biodiesel production process.

Figure 2:
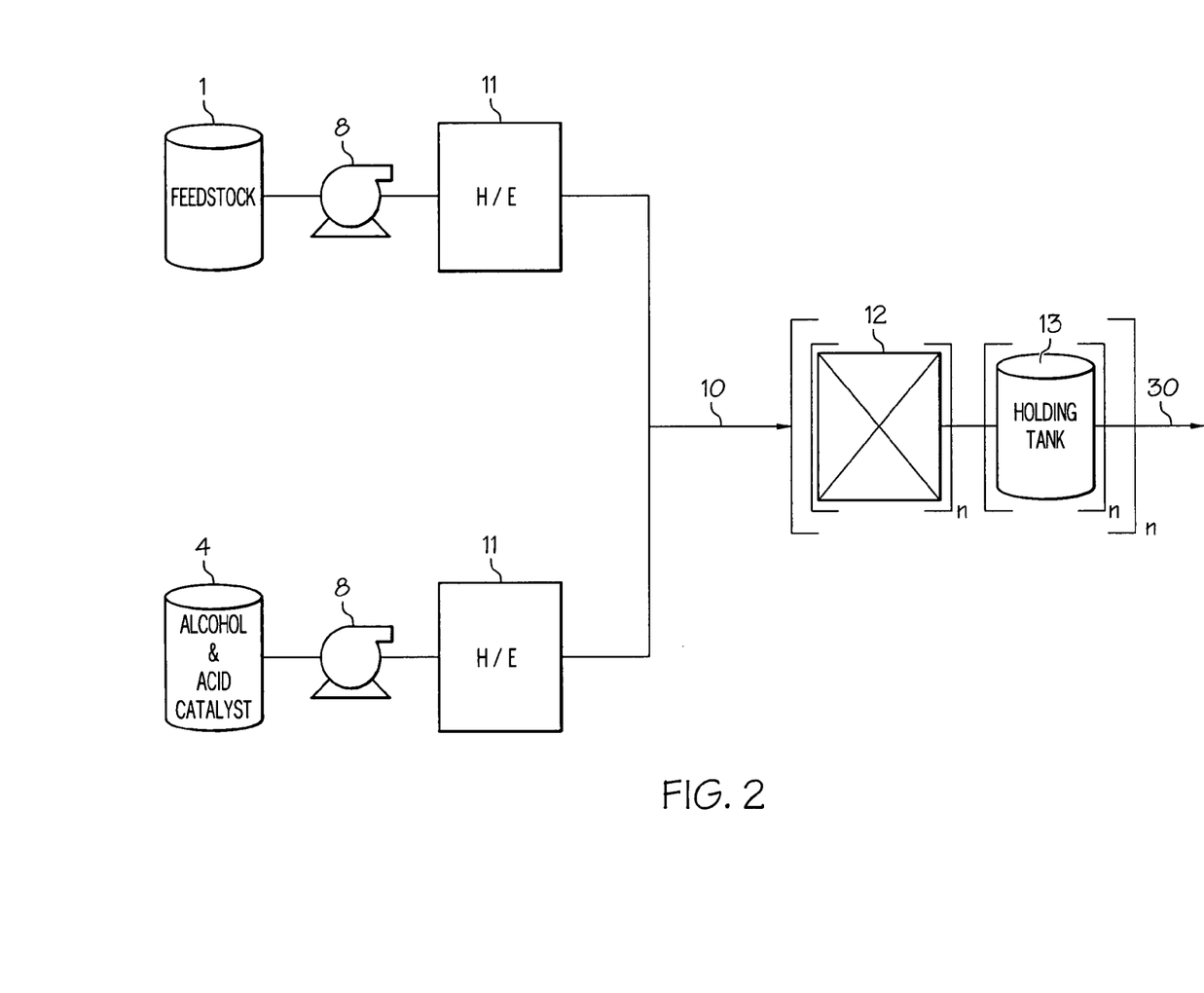
FIG. 2 is a schematic of a process for reducing free fatty acid content of a feedstock stream using at least one controlled flow cavitation apparatus in combination with at least one holding tank.

One embodiment for introducing the reaction mixture 10 into a controlled flow cavitation apparatus 12, as shown in FIG. 2, is to use a pump 8 to force the feedstock from its holding tank 13 through a heat exchanger 11. The heat exchanger 11 is capable of raising the temperature of the feedstock 1 prior to introduction of the alcohol 2 and acid catalyst 3. The heat exchanger 11 can raise the temperature of the feedstock 1 to the range of 70 C to 120° C. For example, the temperature of the feedstock 1 can be raised to at least 70, 80, 90, 100, 110, or 120° C. Prior to introduction with the feedstock, the alcohol and catalyst can be combined and stored. A pump 8 can also be used to force the alcohol and catalyst mixture 4 from its holding tank through a heat exchanger 11. The heat exchanger is capable of raising the temperature of the alcohol and catalyst mixture 4 before introduction to the feedstock 1 to temperatures in the range of 70 C to 130° C. For example, the temperature of the alcohol and feedstock can be raised to at least 70, 80, 90, 100, 110, 120, or 130° C. In a preferred embodiment, the feedstock 1, alcohol and catalyst mixture 4, pumps 8, heat exchangers 11, and cavitation apparatuses 12 are all in fluid communication with each other. Pipes, hoses, or other conventional industrial equipment are used to facilitate the fluid communication of the aforementioned elements. Through this fluid communication, preheated feedstock 1 is combined with the preheated alcohol and catalyst mixture 4 to form a reaction mixture 10. This combination can take place after each stream is forced though a heating element by its respective pump. This reaction mixture 10 is then forced through a controlled flow cavitation apparatus 12 by processing equipment such as a pump 8.

Figure 3:
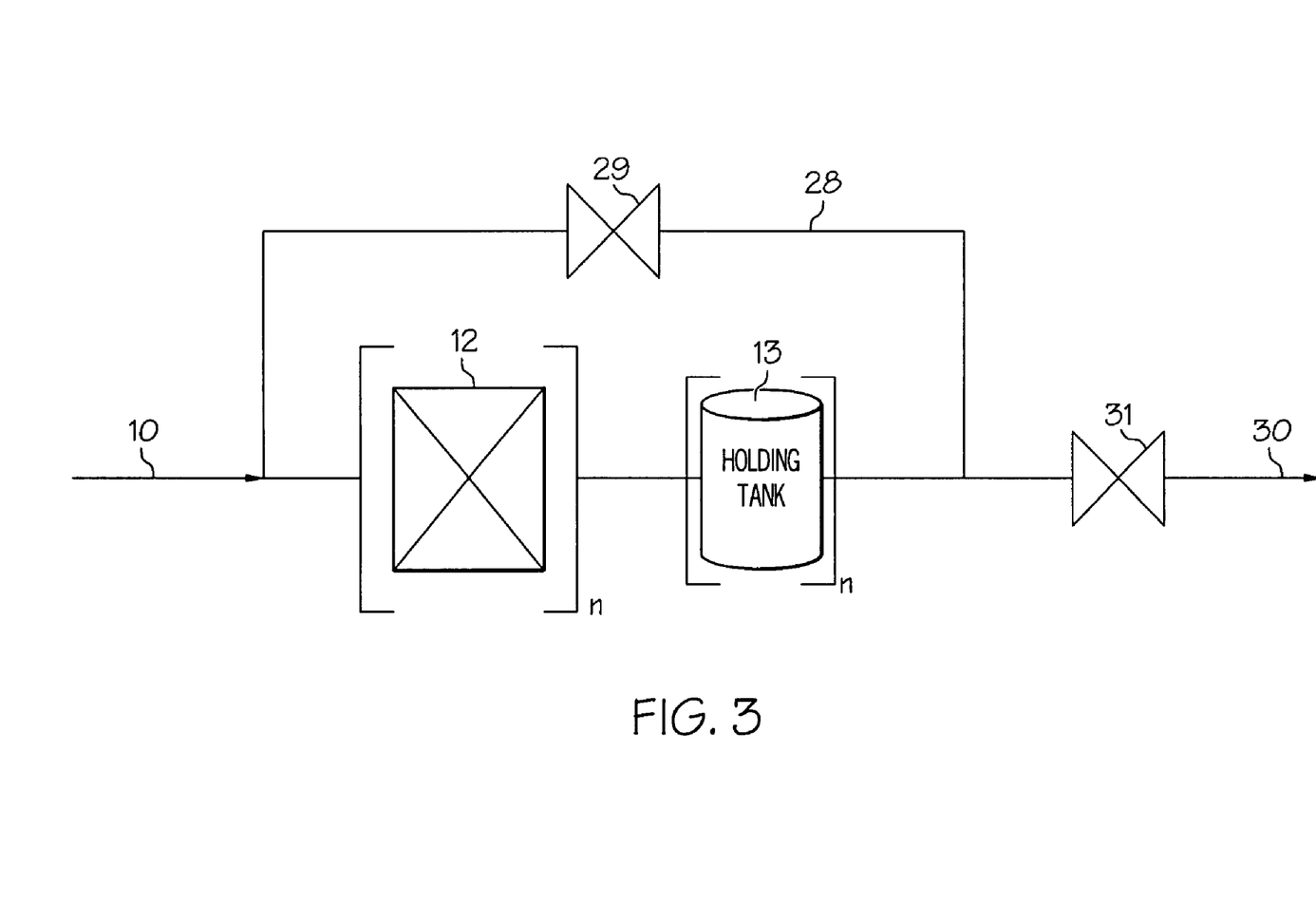
FIG. 3 is a schematic of at least one controlled flow cavitation apparatus and holding tank in a recirculation loop configuration for use in a process for reducing free fatty acid content of a feedstock stream.

FIG. 3 illustrates one embodiment of a controlled flow cavitation apparatus 12 in combination with a holding tank arranged in a recirculation loop 28. The recirculation loop 28 allows for a portion of the reaction product 30 exiting the holding tank to be re-passed through the apparatus and holding tank combination. A control valve 29 in the recirculation loop 28 or a control valve 31 in the pipe or tube downstream of the recirculation loop can be used to adjust the amount of the reaction product exiting the apparatus 12 and holding tank 13 being passed through the apparatus 12 and holding tank 13 for a second time. For example, 1 to 99 percent of the reaction product flow exiting the apparatus 12 and holding tank 13 combination can be recirculated back through the apparatus 12 and holding tank 13 for a second time by adjusting valve 29, 31, or a combination thereof. As shown, the flow through the recirculation loop 28 can be passed through one or multiple controlled flow cavitation apparatuses 12 and holding tanks 13, depending on whether the integer "n" is greater than 1. In theory, without being bound thereto, if at least one controlled flow cavitation apparatus 12 and one holding tank 13 are used, the recirculation loop 28 can act to simulate a series of controlled flow cavitation apparatuses 12 and holding tanks 13 as shown, for example, in FIG. 4. Depending on the amount of reaction product being recirculated, additional apparatuses 12 and holding tanks 13 in series can be reduced without reducing the amount of free fatty acids being removed from the reaction mixture.

Figure 4:
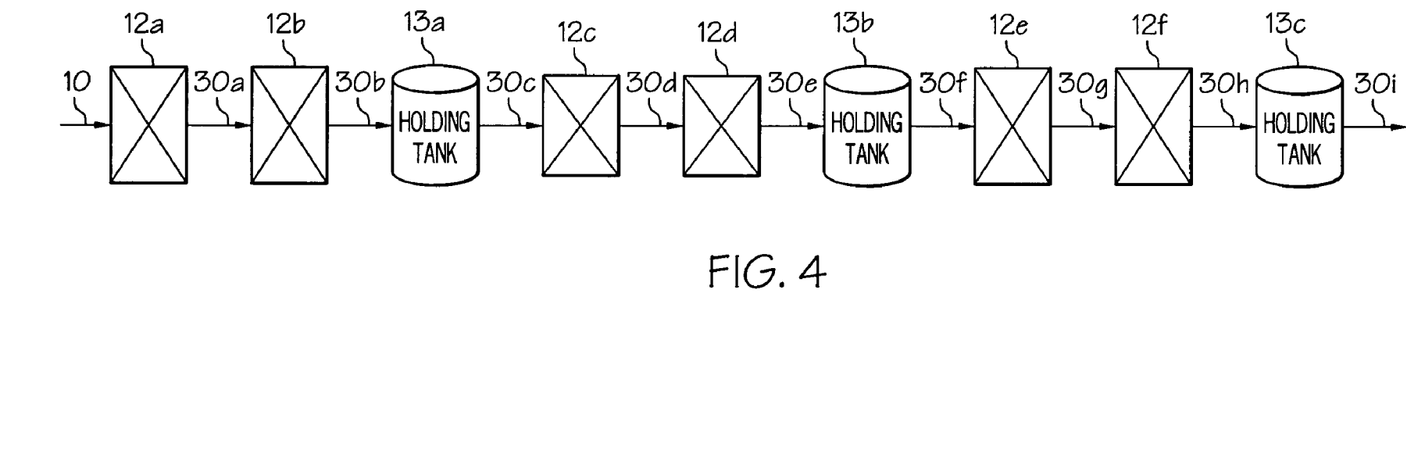
FIG. 4 is a schematic of six controlled flow cavitation apparatuses in series arrangement with three holding tanks for use in a process for reducing the free fatty acid content of a feedstock stream

With respect to FIG. 4, six controlled flow cavitation apparatuses 12a-12f and three holding tanks 13a-13c are arranged in series. At the beginning of the series, two controlled flow cavitation apparatuses 12a, 12b are followed by a holding tank 13a. The two apparatus 12 and one holding tank 13 combination or set is followed up downstream by two more sets of the same apparatuses 12 and holding tank 13 combination. Directly downstream are two controlled flow cavitation apparatuses 12c, 12d and one holding tank 13b, and directly downstream of that combination are two controlled flow cavitation apparatuses 12e, 12f and a holding tank 13c. The reaction stream 10, 30a-30i passes through series of controlled flow cavitation apparatuses and holding tank combinations. As can be seen by FIG. 4, the reaction mixture 10 passes through two controlled flow cavitation apparatuses 12a-12b and then through a holding tank 13a. The reaction stream then passes through this cavitation apparatus/holding tank sequence two more times (12c-12f, 13b-13c). The arrangement of a cavitation apparatus 12 in series with a holding tank 13 facilitates a greater reduction in the free fatty acid content of the feedstock. The placement of a holding tank 13 after a cavitation apparatus 12, or two apparatuses 12 in series, aids in the reduction of free fatty acids by creating a controlled residence time in which the esterification reactions can continue after passing through a set of cavitation apparatuses. For example, the free fatty acid content of the feedstock 1 can be reduced to about 2% or lower with the use of multiple apparatuses 12 and holding tanks 13 being arranged in series with each other, such as the sequence shown in FIGS. 1 through 4. Unreacted free fatty acids remaining in the reaction streams 30 can be reacted in downstream apparatuses and holding tanks.

The invention can be practiced by using any of the known controlled flow cavitation apparatuses, such as those described in U.S. Pat. Nos. 5,180,052; 5,931,771; 5,937,906; 5,971,601; 6,012,492; 6,502,979; 6,802,639; and 6,857,774, the entire contents of which are incorporated herein by reference.

Figure 5:
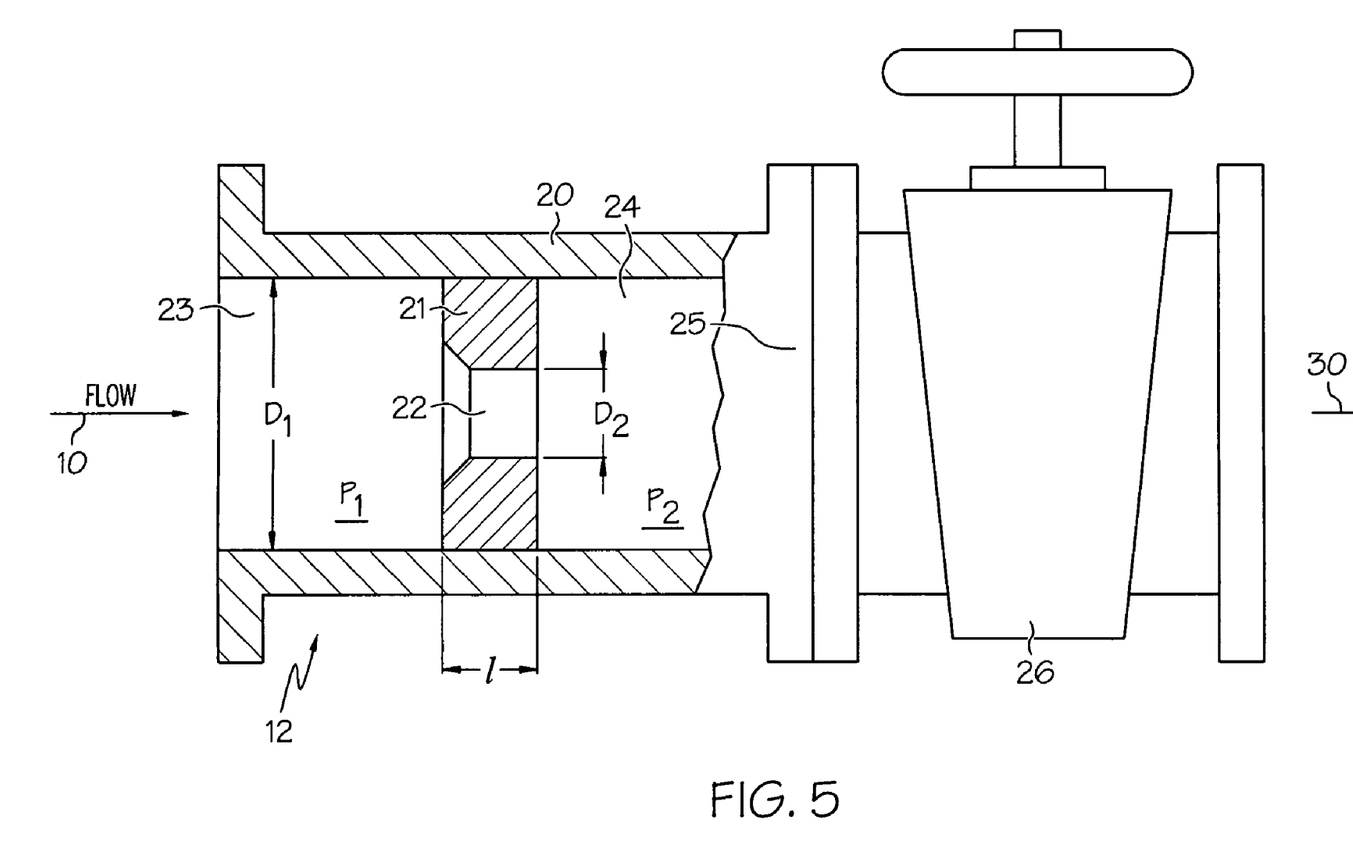
FIG. 5 is a cross-section view of a controlled flow cavitation apparatus

FIG. 5 provides a cross section view of one embodiment of the present invention in which a controlled flow cavitation apparatus 12 can process a reaction mixture 10. The controlled flow cavitation apparatus 12 comprises a flow-through channel 20 comprising a first chamber 23 and a second chamber 24. The first chamber 23 and second chamber 24 of the flow-through channel 20 are divided by a localized flow constriction 21. The first chamber 23 is positioned upstream of the localized flow constriction 21 and the second chamber 24 is positioned downstream of the localized flow constriction 21, as viewed in the direction of movement of flow, such as a reaction mixture 10. Localized flow constriction 21 can be achieved by a diaphragm with one, or more, orifices 22, baffles, nozzles or the like. Although not shown, the flow-through channel can have two or more localized flow constrictions 21 in series. For example, a first localized flow constriction 21 can have one orifice 22 having a first diameter and a second localized flow constriction 21 can have one orifice 22 having a second diameter, wherein the first localized flow constriction is upstream of the second localized flow constriction. The first and second diameters of the in-series orifices 22 can be the same or vary, such as the first orifice 22 diameter being smaller or larger than the second orifice 3 diameter.

As the reaction mixture 10 comprising feedstock 1 containing high free fatty acid content, alcohol 2, and acid catalyst 3 passes through the cavitation apparatus 12, the free fatty acids of the feedstock 1 are esterified in the presence of the acid catalyst 3 and alcohol 2, which reduces the free fatty acid content of the feedstock 1. The esterification reactions takes place in the local hydrodynamic cavitation zone and subsequent holding tank 13. The product of the esterification reaction is a reaction product stream 30 that comprises fatty acid esters, water, unreacted alcohol, unreacted FFA, unreacted feedstock, catalyst and transient intermediates. In a preferred embodiment, the reaction mixture 10 passes through six controlled flow cavitation apparatuses 12 and three holding tanks 13, wherein the holding tanks are positioned between every two apparatuses in series. Feedstock 1 and the alcohol 2 are reacted in each of the hydrodynamic cavitation zones. Further reaction of feedstock 1 and alcohol 2 take place in each of the holding tanks 13. After passing through each apparatus 12 and holding tank 13 combination, an intermediate reaction product stream 30 is formed that comprises fatty acid esters, water, unreacted alcohol, unreacted FFA, unreacted feedstock, catalyst and transient intermediates.

The hydrodynamic cavitation zone is produced as a function of one or more of the temperature of the esterification reaction, the pressure drop across the constriction 21, 22, and the residence time across the restriction orifice 22. A pressure differential is created by the flow of the reaction mixture 10 or intermediate reaction product 30 as it passes over and through the local restriction orifice 22 or orifices (not shown) of each cavitation apparatus 12. The magnitude of the pressure differential is controlled by the size of the orifice 22, the flow rate of the reaction mixture 10, and a localized hydraulic resistance 26 downstream of the apparatus 12.

The restriction of flow in the controlled flow cavitation apparatus 12 can be provided by localized flow constriction 21, such as an orifice 22, baffle, nozzle or the like. As shown in FIG. 5, the controlled flow cavitation apparatus 12 comprises one annular orifice 22. The orifice 22 of the apparatus can be any shape, for example, cylindrical, conical, oval, right-angled, square, etc. Depending on the shape of the orifice 22, this determines the shape of the cavitation jets flowing from the localized flow constriction 21. The orifice 22 can have any diameter, $D_2$. For example, the diameter can be in the range of about 10 μm to 10 mm, preferably between 50 μm and 5 mm, more preferably between 100 μm and 1 mm, or can be between 0.4 mm and 0.8 mm. The localized flow constriction 21 can also be a baffle. The baffle can extend from the wall of the flow-through channel 20. The baffle can be of any size and shape, and thus can be configured to interrupt flow of the reaction mixture 10 such that the pressure differential across the apparatus 12 can be controlled.

As shown in FIG. 5, at outlet 25 from the second chamber 24, a localized hydraulic resistance 26 can be used to maintain back pressure in the flow-through channel 20, the first chamber 23 or second chamber 24. The localized hydraulic resistance 26 can be valve as known in the art, such as a ball valve, butterfly valve, globe valve, needle valve or gate valve. As shown, the first chamber 23 has a pressure $P_1$ and the second chamber 24 has a pressure $P_2$. Flow into the apparatus 12 can be provided with the aid of fluid pumping devices as known in the art, such as a pump, centrifugal pump, rotodynamic pump, positive-displacement pump or diaphragm pump. As discussed herein, pressure $P_1$ is defined as the processing pressure for the controlled flow cavitation apparatus 12.

The processing pressure is reduced as the reaction mixture 10 passes through the flow-through channel 20 and orifice 22. Maintaining a pressure differential across the localized flow constriction 21 or orifice 22 allows control of the cavitation intensity in the flow through channel 20. The pressure differential across the localized flow constriction 21 or orifice 22 is at least 50, 70, 100, 150, 200, 250, 300, 350 or 400 psi. Preferably, a pressure differential across a controlled flow cavitation apparatus 12 can be maintained in the range of 50-400, preferably 50-300, more preferably 50-200 psi. In the embodiment illustrated in FIG. 5, the average pressure differential across all six controlled flow cavitation apparatuses can be in the range of 50-300, 50-250, and 50-200 psi. The flow rate of the reaction mixture 10 through the one or more orifices 22 in the controlled flow cavitation apparatus 12 can be in the range of 100 mL per minute to 100 m³ per minute, or 1 L per minute to 10 m³ per minute, or 10 L per minute to 1 m³ per minute. More preferably the flow rate of the reaction mixture can be in the range of 0.6 to 0.7 liters per minute (lpm).

Flow of the reaction mixture 10 across the orifice 22 or orifices (not shown) create a hydrodynamic cavitation zone that promotes a high density of cavitation power dissipation locally inside the flow-through channel 20, and more preferably in the orifice 22 chamber (l) and downstream of the orifice 22 in the second chamber 24. The high energy dissipation in the hydrodynamic cavitation zone causes the formation, growth, and eventual implosive collapse of vapor bubbles within the liquid. This collapse then releases a tremendous amount of energy which acts to mix or break apart the free fatty acids and facilitate an increased number in esterification reaction sites for the alcohol to attack.

Hydrodynamic cavitation zone in the orifice chamber (l) and second chamber 24 arises in the fluid jets of the reaction mixture 10 flowing from the orifice 22 in the form of intermingling cavitation bubbles and separate cavitation cavities. The length (l) in orifice 22 in localized flow constriction 21 is selected in such a manner in order that the residence time of the cavitation bubble in the orifice 22 and/or the second chamber 24 does not exceed a specific time. Thus, the hydrodynamic cavitation zone comprises the orifice 22 and second chamber 24. Once the reaction mixture 10 has passed through the second chamber 24, it can enter a holding tank 13. The implosive collapse of vapor bubbles within the liquid reaction mixture continues to take place in the holding tank 13. In one preferred embodiment as shown in FIG. 4, the residence time of the reaction mixture 10 across all six cavitation apparatuses 12 and all three holding tanks 13 is not longer than 20 minutes, preferably 10 minutes, preferably not longer than 7 minutes, and more preferably not longer than 5 minutes. The time in the hydrodynamic cavitation zones and the holding tanks 13 needed to facilitate the esterification reactions for reducing the free fatty acid content of the feedstock is less than the time needed to facilitate the same or similar esterification reactions in conventional methods, such as multi-step batch reactor processes. Thus the controlled flow cavitation apparatus and holding tank combinations described herein can reduce processing time and costs associated with the biodiesel production process. Further, hydrodynamic cavitation is more efficient than acoustic cavitation and much more efficient than conventional agitation and/or heating methods. The scale-up of hydrodynamic cavitation arrangements is relatively easy compared to other methods, which makes it well suited to the processing of dispersions and solutions, such as those present in an esterification reaction to reduce the free fatty acid content. As shown herein, the arrangement of controlled flow cavitation apparatuses 12 in series with holding tanks 13 provides an efficient method of converting free fatty acids to fatty acid alkyl esters that reduces processing time, energy, costs, and equipment.

The given dynamic pressure and residence time of the bubble in the localized flow constriction 21 and orifice 22 allows for production of cavitation bubbles and cavities in the reaction mixture 10 flow. The cavity sizes are dependent on the magnitude of the dynamic pressure jet as well as the sizes of orifice 22 in the localized flow constriction 21. Increase of the dynamic pressure jet as well as size of orifice 22 leads to the increase in the sizes of cavitation bubbles. Increase of the dynamic pressure of the cavitation fluid jet also promotes increase of the concentration of cavitation bubbles. Therefore, given the dynamic pressure of the cavitation fluid jet, its shape, and the number of fluid jets, it is possible to produce a cavitation zone of cavitation bubbles and their required concentration and sizes. Cavitation bubbles and cavities together with the liquid jets enter into the second chamber 24, where they collapse under the influence of static pressure $P_2$. The energy emitted during collapse of cavitation bubbles is directly proportional to the magnitude of the static pressure in the surrounding liquid bubbles. Therefore, the greater the magnitude of $P_2$ the greater the energy emitted during collapse of cavitation bubbles and the better the dispersion and/or size reduction effect. In other words, the level of energy dissipation in the reaction mixture 10 increases as the magnitude of $P_2$ increases and thus the severity or hardness of collapse of each cavitation bubble separately increases, as well as the level of energy dissipation due to the decrease of the volume in which these bubbles collapse.

As discussed above, the magnitude of static pressure $P_2$ in second chamber 24 is maintained due to the location of the additional localized restriction 26 at the outlet from this chamber. The additional localized restriction may be adjustable or non-adjustable. By utilizing the adjustable additional localized resistance 26 it is possible to control the severity or hardness of cavitation influence and in the same process, the cavitation dispersion and reduction of free fatty acid by means of esterification.

Figure 6:
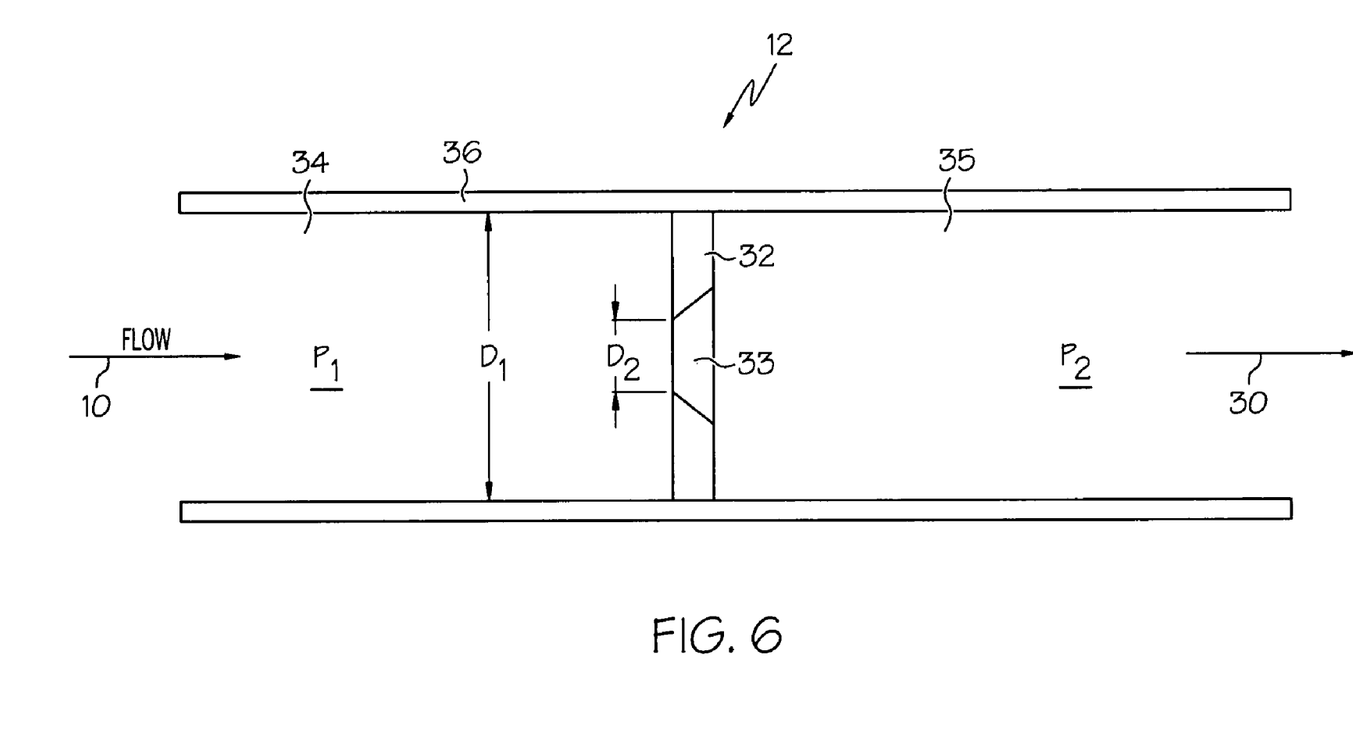
FIG. 6 is a cross-section view of a controlled flow cavitation apparatus.

In another embodiment, FIG. 6 illustrates a controlled flow cavitation apparatus 12, wherein the sharp-edged orifice 33, positioned in the localized flow constriction 32, has a diameter, $D_2$. The inlet diameter to the controlled flow cavitation apparatus 12 is designated as $D_1$. The localized flow constriction 32 divides the flow through channel 36 into two chambers, a first chamber 34 having pressure $P_1$ and a second chamber 35 having pressure $P_2$. Although not shown, the controlled flow cavitation apparatus 12 of FIG. 6 can have an additional localized restriction, such as a valve, at the outlet of the second chamber 25 in order to alter the cavitation influence on the dispersion and reduction of free fatty acids as a result of the esterification reactions. The additional localized restriction may be adjustable or non-adjustable. As described above, a reaction mixture 10 can be forced or passed through the controlled flow cavitation apparatus 12 of FIG. 5 in order to reduce the level of free fatty acids in the feedstock.

Controlled flow cavitation apparatuses 12 and holding tanks 13 can be integrated or retro-fitted into as a pretreatment process in a biodiesel production process, such as shown in FIG. 1 and FIG. 2. As shown in FIGS. 1 and 2, the controlled flow cavitation apparatus 12 and a holding tank 13 can be aligned in series with other apparatuses 12 and holding tanks 13 when the integer "n" is greater than 1. In another embodiment as shown in FIG. 3, a controlled flow cavitation apparatus and a holding tank combination can be retrofitted to allow for recirculation of the reaction product through a single cavitation apparatus 12 and holding tank 13, or a series of apparatuses 12 and holding tanks 13 for n>1. In another embodiment, a controlled flow cavitation apparatus 12 and a holding tank 13 can be retrofitted or integrated at the end of a batch reactor process to increase reduction of free fatty acids in the feedstock.

Using the combination of cavitation apparatuses 12 and holding tanks 13 as described herein, the free fatty acid content can be reduced from up to 30% by weight of feedstock down to 2% and often below 1%. This reduction is consistently done in under 20 minutes, preferably under 10 minutes and often under 5 minutes. Consistent reduction of the free fatty acid content to below 2% in under 10 minutes is obtainable with the use of six cavitation apparatuses 12 and three holding tanks 13 in series, for example as shown in FIG. 4.

In order to promote a further understanding of the invention, the following examples are provided. These examples are shown by way of illustration and not limitation.

Example 1

A reaction mixture was prepared by combining the reactants from two holding tanks. The first holding tank contained feedstock having a free fatty acid content, palmitic acid, of 12% by weight in a mixture with degummed soybean oil. The second holding tank contained a mixture of methanol and sulfuric acid. The reaction mixture contained 1% sulfuric acid by weight of the feedstock and 96% methanol by weight of the total mixture. The mixture was passed through six cavitation apparatuses and three holding tanks in series, in an arrangement as shown in FIG. 4. More specifically, six cavitation apparatuses are arranged in series with each other while a holding tank is placed in series after every two cavitation apparatuses. The result of the run is shown in Table 1 below. All reactants were maintained at 124° C. while the initial cavitation occurred at 117° C., and the holding tanks maintained the reaction mixture at 120° C. The reaction stream moved through the apparatuses at a flow rate of 0.66 liters per minute (lpm). The orifice diameters of the six cavitation apparatuses varied from 0.018 inch to 0.030 inch or about 0.46 mm to 0.79 mm. The pressure drop over the cavitation apparatuses was an average of 142 psi. A residence time of approximately 5 minutes was obtained over the three holding tanks. Samples taken at the end of the run after being cooled to 51° C. indicate that the free fatty acid content was reduced through esterification to 0.5% by weight of the feedstock. Free fatty acid content was determined by gas chromatography.

Example 2

A reaction mixture was prepared by combining the reactants from two holding tanks. The first holding tank contained a feedstock, grease, with free fatty acid, oleic acid, at 3.8% by weight by titration according to AOCS method CA 5a-40. The second holding tank contained methanol and sulfuric acid. The reaction mixture contained 0.5% sulfuric acid by weight of the feedstock and 97% methanol by weight of the total mixture. The mixture was then run through six cavitation apparatuses and three holding tanks in series. More specifically, six cavitation apparatuses are arranged in series with each other while a holding tank is placed in series after every two cavitation apparatuses. The result of the run is shown in Table 1 below. All reactants were maintained at 119° C. while the initial cavitation occurred at 113° C., and the holding tanks maintained the reaction mixture at 110° C. The reaction stream moved through the apparatuses at a flow rate of 0.63 lpm. The orifice diameters of the six cavitation apparatuses varied from 0.018 in to 0.030 in. or about 0.46 mm to 0.76 mm. The pressure drop over the cavitation apparatuses was an average of 154 psi. A residence time of approximately 5 minutes was obtained over the three holding tanks. Samples taken at the end of the run after being cooled to 50° C. indicate that the free fatty acid content was reduced through esterification to 0.7% by weight of the feedstock. Free fatty acid content was determined by gas chromatography.

Example 3

A reaction mixture was prepared by combining the reactants from two holding tanks. The first holding tank contained a feedstock of pit grease with free fatty acid content of 4.03% by weight. The second holding tank contained methanol and sulfuric acid. The reaction mixture contained 1% sulfuric acid by weight of the feedstock and 91.5% methanol by weight of the total mixture. The mixture was then run through six cavitation apparatuses and three holding tanks in series. More specifically, six cavitation apparatuses are arranged in series with each other while a holding tank is placed in series after every two cavitation apparatuses. The result of the run is shown in Table 1 below. All reactants were maintained at 122° C. while the initial cavitation occurred at 113° C., and the holding tanks maintained the reaction mixture at 114° C. The reaction stream moved through the apparatuses at a flow rate of 0.60 lpm. The orifice diameters of the six cavitation apparatuses varied from 0.020 in to 0.031 in or about 0.51 mm to 0.79 mm. The pressure drop over the cavitation apparatuses was an average of 92 psi. A residence time of approximately 5 minutes was obtained over the three holding tanks. Samples taken at the end of the run after being cooled to 53° C. indicate that the free fatty acid content has been reduced through esterification to 0.7% by weight of the feedstock. Free fatty acid content was determined by gas chromatography.

TABLE 1 shows the results and parameters of the examples.

| Example No. | initial FFA % | % acid catalyst | % alcohol | final FFA % | flow rate (lpm) | orifice range (in) | average pressure drops (psi) | Residence time (min) | feedstock holding tank temp (° C.) | initial cavitation temp (° C.) | holding tanks temp (° C.) | cooling temp (° C.) |
|---|---|---|---|---|---|---|---|---|---|---|---|---|
| 1 | 12 | 1 | 96 | 0.5 | 0.66 | 0.018-0.03 | 142 | 5 | 124 | 117 | 120 | 51 |
| 2 | 3.8 | 0.5 | 97 | 0.7 | 0.63 | 0.018-0.03 | 154 | 5 | 119 | 113 | 110 | 50 |
| 3 | 4.03 | 1 | 91.5 | 0.7 | 0.6 | 0.020-0.031 | 92 | 5 | 122 | 113 | 114 | 53 |

As can be seen in Table 1, the final free fatty acid content was reduced to at least 1%, with the lowest free fatty acid content of 0.5%, by weight of the feedstock. Out of the three examples, the greatest reduction was seen when a higher flow rate and reaction temperature were chosen.

Controlled cavitation apparatuses 12 in combination with holding tanks 13 allow the user to control the parameters of the esterification reaction. The user can control the temperature of the reaction by passing the reaction through the heat exchangers 11 as well as the holding tanks 13. The user can also control the pressure drop across local constrictions and the flow rate by varying the outlet pressure of the pump 8 used to pass the reaction mixture through the controlled flow cavitation apparatuses 12 and holding tanks 13. The pressure can also be adjusted by varying the diameter of the orifices. A user can also adjust the number of cavitation apparatuses 12 and holding tanks 13 that the reaction mixture 10 will flow through.

It should now be apparent that there has been provided, in accordance with the present invention, a novel process for the pretreatment of a biodiesel feedstock source, wherein the free fatty acid content is reduced by esterification in hydrodynamic cavitation zones and subsequent holding tanks. Moreover, it will be apparent to those skilled in the art that many modifications, variations, substitutions, and equivalents for the features described above may be effected without departing from the spirit and scope of the invention as defined in the claims to be embraced thereby.

The preferred embodiment has been described, herein. It will be apparent to those skilled in the art that the above methods may incorporate changes and modifications without departing from the general scope of this invention. It is intended to include all such modifications and alteration in so far as they come within the scope of the appended claims or the equivalents thereof.

What is claimed is:

1. An esterification pretreatment method for reducing a high free fatty acid feedstock comprising:
   providing a feedstock comprising a free fatty acid content in the range of 3 to 30% by weight;
   providing an alcohol and an acid catalyst;
   combining the said feedstock with said alcohol and said acid catalyst to form a reaction mixture;
   forcing said reaction mixture though at least two controlled flow cavitation apparatuses at a processing pressure capable of generating a hydrodynamic cavitation zone in each said controlled flow cavitation apparatus;
   maintaining a pressure differential across each said controlled flow cavitation apparatus in the range of 50 to 250 psi;
   holding said reaction mixture exiting said at least one controlled flow cavitation apparatus in a holding tank for at least 10 minutes at a temperature of at least 100° C., wherein the free fatty acid content of said feedstock is reduced to less than 2% by weight by way of esterification reactions.

2. The method of claim 1, said feedstock being selected from the group consisting of soybean oil, corn oil, cottonseed oil, olive oil, palm oil, palm kernel oil, peanut oil, linseed oil, safflower oil, canola oil, rapeseed oil, sesame oil, coconut oil, jatropha oil, mustard seed oil, castor oil, tall oil, algae oil, soap stock, beef tallow, lard, brown grease, white grease, yellow grease, fish oils, bacterial oils or fungal oils.

3. The method of claim 1, said alcohol being present in an amount of from about 90 to 99% by weight of said reaction mixture.

4. The method of claim 1, the acid catalyst being present in an amount of from about 0.1 to 2% by weight of said feedstock.

5. The method of claim 1, where in the ratio of acid catalyst to free fatty acid in the reaction mixture is in the range of 0.01:1 to 0.5:1.

6. The method of claim 1, wherein the ratio of alcohol to free fatty acid in the reaction mixture is in the range of 200:1 to 1000:1.

7. The method of claim 1, wherein said esterification reactions produce esterified fatty acids and triglycerides.

8. The method of claim 7, wherein the said esterification reaction product and remaining unesterified free fatty acids below 2% by weight is introduced as a starting reaction stream in a transesterifaction reaction to produce biodiesel fuel.

9. The method of claim 7, wherein said pretreatment method is separately carried out prior to using said esterification reaction product in a biodiesel production process.

10. The method of claim 1, wherein said acid catalyst is selected from the group consisting of sulfuric acid, hydrochloric acid, phosphoric acid, an acidic metal halide, or combinations thereof.

11. The method of claim 1, wherein said reaction mixture is pre-heated to at least a temperature of 100° C. prior to being forced through said controlled flow cavitation apparatus.

12. The method of claim 1, wherein said free fatty acid content of said feedstock is reduced to less than 1% by weight by way of esterification reactions.

13. The method of claim 1, said at least two controlled flow cavitation apparatuses being in series.

14. The method of claim 1, said feedstock having a free fatty acid content in the range of 3 to 15% by weight.

15. A method of reducing the free fatty acid content of a feedstock comprising:
- mixing a feedstock comprising a free fatty acid content in the range of 3 to 30% by weight with an alcohol and acid catalyst to form a reaction mixture, wherein said alcohol to free fatty acid content of said feedstock is present in a ratio of at least 200:1;
- passing said reaction mixture through at least two controlled flow cavitation apparatuses in series;
- maintaining a pressure differential across each said controlled flow cavitation apparatus in the range of 50 to 400 psi;
- holding said reaction mixture exiting said at least two controlled flow cavitation apparatuses in a holding tank at a temperature of at least 100° C., wherein said free fatty acid content is reduced to lower than 2% through esterification reactions;
- completing said reduction of free fatty acid content in said feedstock to lower than 2% by weight within 20 minutes.

16. The method of claim 15, wherein said free fatty acid content of said feedstock is reduced to below at least 1% by weight.

17. The method of claim 15, wherein said free fatty acid content of said feedstock is reduced to below at least 0.5% by weight.

18. The method of claim 15, said feedstock having a free fatty acid content in the range of 3 to 15% by weight.

* * * * *